July 4, 1944.  F. G. DA ROZA ET AL  2,353,014
CONTROL MEANS
Filed May 5, 1942  2 Sheets-Sheet 1
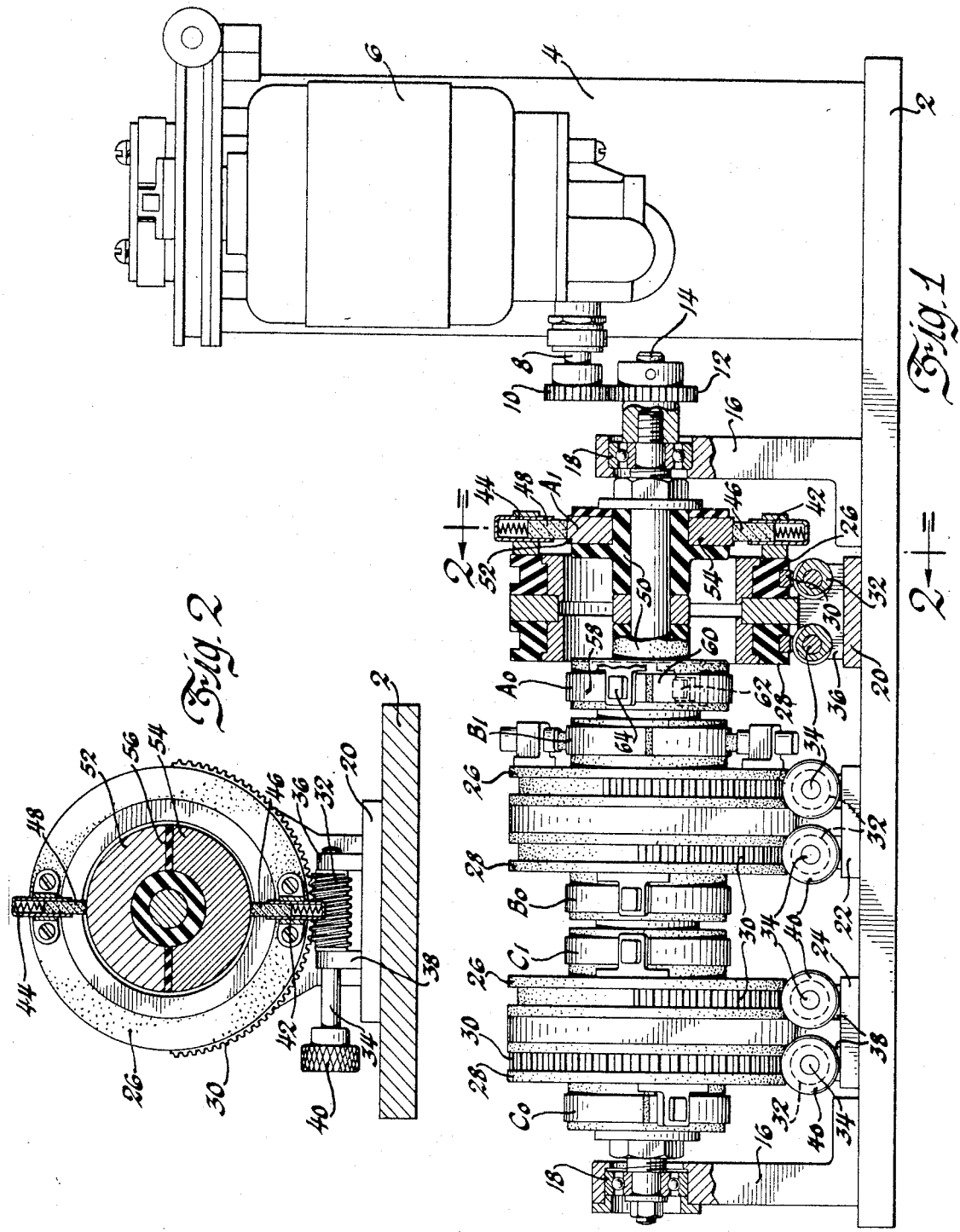
Inventors
Francis G. Da Roza &
Wilson T. Bratton
By
Blackmore, Spencer & Hunt
Attorneys Patented July 4, 1944

2,353,014

UNITED STATES PATENT OFFICE 2,353,014

CONTROL MEANS

Francis G. da Rosa, Ferndale, and Wilson T. Bratton, Detroit, Mich., assignors to General Motors Corporation, Detroit, Mich., a corporation of Delaware Application May 5, 1942, Serial No. 441,816

3 Claims. (Cl. 175—364)

This invention relates to a control system and more specifically to a timing system for controlling welding operations. As is well-known, in the normal operation of a welding machine it is necessary to provide in one complete welding cycle a plurality of steps thereof, namely, a time during which the whole system is deenergized, referred to as an "off" time; second, a period during which the work is clamped between the electrodes, but at which time no welding current yet flows, which is called a "delay" time; third, the time during which the welding current flows through the electrodes and the work, which is called the "weld" time; and, fourth, a time during which the electrodes are still held together to allow the metal to harden, during which time no current flows, which is referred to as the "hold" time. Therefore, each welding cycle is composed of four steps: an "off," "delay," "weld," and "hold" time. It is necessary in order to provide proper welds to be able to adjust and to accurately set the times of these various steps of the complete welding cycle.

It is therefore an object of our invention to provide means for accurately adjusting and maintaining the certain timing periods for the various steps of the welding cycle.

It is a further object of our invention to provide timing mechanism for these various steps which is simple, may be easily changed to a different adjustment and which will maintain their relatively adjusted position accurately.

With these and other objects in view which will become apparent as the specification proceeds, our invention is best understood by reference to the following specification and the illustrations in the accompanying drawings, in which:

Figure 1 is a front elevation partly in section of the timing means of our invention;

Figure 2 is a sectional view taken on line 2—2 of Figure 1; and

Figure 3:
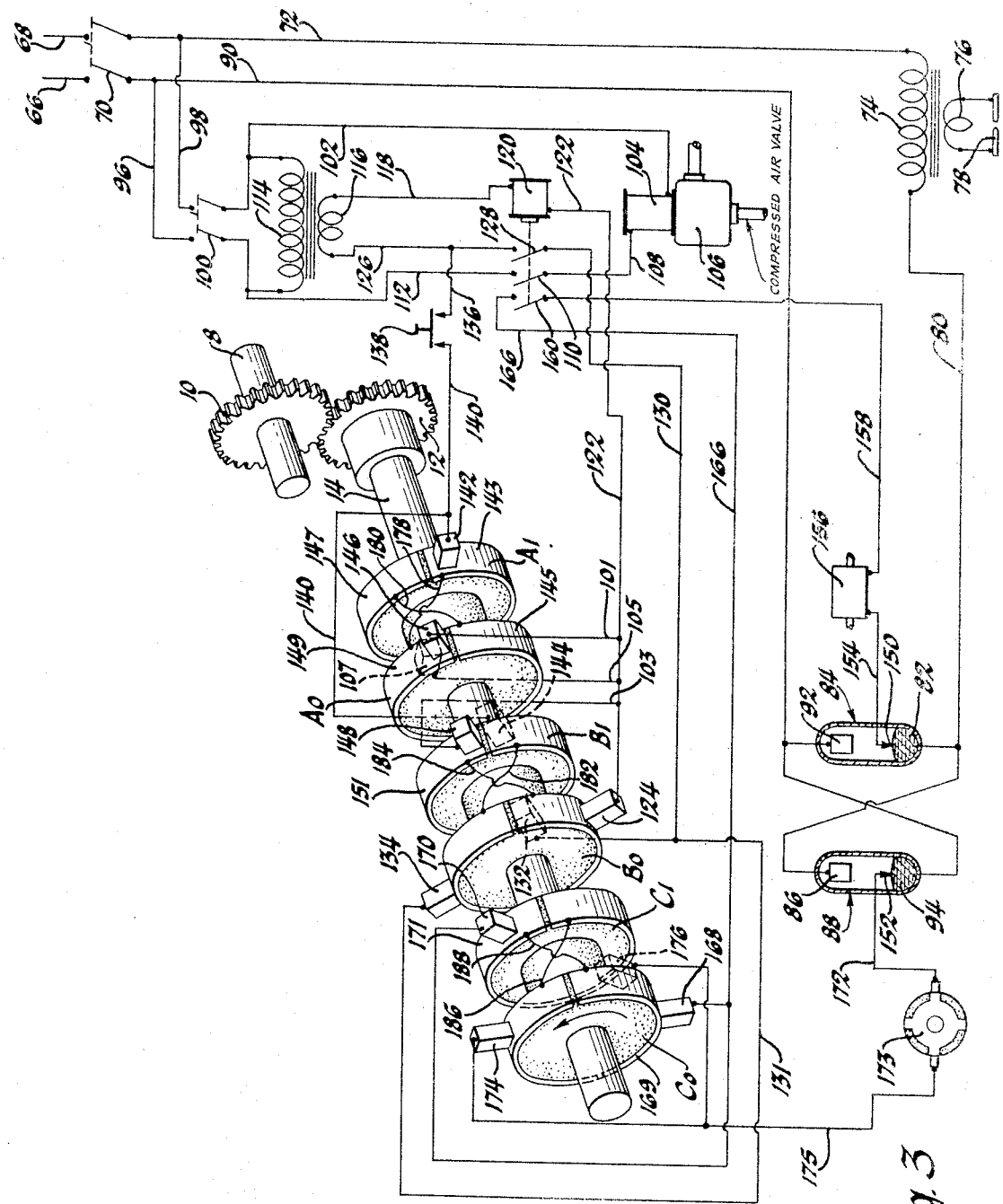
Figure 3 is a schematic perspective view showing the adjustable commutator means with their associated electrical connections in the circuit.

Referring now more specifically to Figure 1, there is therein shown a base 2 which supports an upright member 4 upon which is suitably secured a driving motor 6, the shaft 8 of which carries upon its outer end a gear 10 which mates with a second gear 12 on the end of a longitudinally extending control shaft 14. This shaft 14 is trunnioned in an upright pair of brackets 16 and supported by means of two ball bearing assemblies 18 so that it may be freely rotatable therein. At spaced intervals along the base 2 are provided supporting assemblies 20, 22 and 24, each of which supports a pair of rings 26 and 28 which are made of insulating material and are adapted to be moved around a center point which is coincident with the axis of the shaft. Set into a groove in the outer periphery of each of these rings is a worm gear sector 30 which is adapted to mesh with a worm 32, each of these worms 32 being mounted on a rotatable shaft 34 carried in two upstanding ears 36 and 38 from the base 20. The end of each shaft 34 is provided with a manually operated knurled knob 40 which may be used for adjusting the movement of the insulating disc around to different angular positions. Thus each assembly has two manual screws 40 by the adjustment of which the associated insulating disc may be moved to different angular positions.

On the sides of each of the insulating discs there are secured at diametrically opposite positions a plurality of brush holders 42 and 44 in which are carried brushes 46 and 48 which are spring-biased toward the axis of the shaft and upon the shaft between these two brushes there is provided a wheel of insulating material 50 which carries two segments 52 and 54 of substantially half a diameter each of conductive material. These two segments are kept apart from any electrical contact by a thin strip 56 of insulating material which extends entirely across the wheel. Thus these two members 52 and 54 are never in electrical contact and cooperate with their associated brushes 46 and 48 to control an electrical circuit to be described. The other insulating wheel 28 of the first assembly also has its associated commutator segments, which are shown at 58 and 60, and associated brushes 62 and 64. Each of the other group assemblies also consists of a pair of commutators and their brushes and are mounted upon bases 22 and 24 and are exactly the same construction so further detailed description of these will not be included at this time.

It will be seen, therefore, from the above description that by moving the knurled knob 40 in each instance the insulating wheel and therefore the brushes mounted thereon may be moved angularly with respect to the commutator portions and therefore an adjustment may be made on the timing of the circuit which each commutator and brush controls.

In the particular instance illustrated herein the two commutators shown to the left in Figure 1, namely the ones mounted upon the block 24 and labeled $C_0$ and $C_1$, control the actual welding current which is applied to the circuit. The two commutator assemblies shown mounted upon the base 22, namely, those labeled $B_0$ and $B_1$, control the clamping solenoid time, or the time during which the two electrodes clamp the piece to be welded between them, and the two commutator assemblies mounted upon base 20, namely, those labeled $A_0$ and $A_1$, control the starting time.

In order to properly understand the control, it will next be necessary to refer to Figure 3 which illustrates the connection of these various adjustable commutator assemblies into a normal welding circuit. In Figure 3 therefore we find an incoming line 66, 68 in which there is provided a main switch 70 from which the line 72 proceeds to a primary 74 of a welding transformer, to the secondary 76 of which is connected a pair of welding electrodes 78. The opposite side of the primary 74 is connected through wire or line 80 to one terminal 82 of an ignitron tube designated generally at 84. This line 80 is also connected to the plate terminal 86 of a second ignitron tube indicated generally at 88. Coming from the other side of the switch 70 there is provided a line 90 which is connected directly to a second terminal or plate 92 of the first ignitron tube 84 and also to a second electrode 94 of the second ignitron 88. These two ignitron tubes of course control the main power flow to the welding transformer and are connected in what is commonly known as "back-to-back" relation.

Tapped from the lines 90 and 72 are two short lines 96 and 98 which terminate in a double-pole, single-throw switch 100 which has connected to one pole thereof a line 102 which extends to one terminal of a solenoid 104 which operates an air valve 106 for controlling the position of the welding electrodes, namely, whether they clamp the work between them, or are open. The opposite connection of the solenoid valve 104 is made to line 108 which extends to a switch point 110 of a solenoid operated switch, the opposite terminal of which is connected to a line 112 and thus back to one terminal of the switch 100.

Connected directly across the switch 100 is a primary 114 of a transformer, the secondary 116 of which has one terminal connected to line 118 which terminates at one of the connections of solenoid 120, the opposite terminal of which is connected by line 122 to brush 124 which cooperates with the commutator member $B_0$. Line 122 is also connected to line 101 which is connected to brush 146 which engages commutator disc $A_0$, to line 103 which is connected to brush 148 which engages commutator disc $B_1$, and also to line 105 which is connected to brush 107 which engages commutator disc $A_1$. The opposite side of the secondary 116 of the transformer is connected to line 126 which terminates in a stationary contact cooperating with movable switch contact 128 which is connected by line 130 to a brush member 132 engaging commutator disc $B_1$ and also to line 131 which extends to brush member 134 engaging commutator disc $B_0$. Tapped from the line 126 is also a short leader 136 which is connected to a push button switch 138, the opposite side of which is connected to a line 140 which in turn is connected to a brush member 142 which cooperates with a commutator disc $A_1$. Line 140 is also connected to a brush 144 which cooperates with commutator disc $A_0$.

The ignitron tubes 84 and 88 are of the type in which the main current is carried by the mercury vapor between the two electrodes, the lower of which is a pool of mercury but these tubes will not ignite or fire themselves unless they are ignited in some manner such as a small ignition electrode which has power applied therethrough to cause a cathode spot on the surface of the mercury which immediately allows the tube to fire. Each of these tubes is therefore shown supplied with an ignition electrode such as 150 and 152, the first of these being connected by line 154 to a water flow switch 156, the opposite terminal of which is connected by line 158 to the movable switch member 160, the cooperating stationary member of which is connected by line 166 to brush 168 cooperating with commutator segment $C_0$ and also with brush 170 which cooperates with commutator disc $C_1$. The other ignition electrode 152 is connected by line 172 to a phase shifting device 173 and thence by line 175 to brush 174 which cooperates with the commutator disc $C_0$ and also with brush 176 which cooperates with commutator disc $C_1$.

The phase shifting device is nothing more than an adjustable commutator synchronously rotated by the same motor 6 to cause a momentary passage of current through this line to the ignition electrodes when desired and forms no part of the present invention and is fully described in a copending application, Serial No. 394,524, entitled "Welding heat control," filed May 21, 1941, in the name of Francis G. da Roza. All of the switches 108, 110 and 128 are operated simultaneously by the solenoid 120.

It is desired to point out at this point that in each instance the commutator segment forming approximately one-half of the arc on a given disc is connected across by a line such as 178 in discs $A_0$, $A_1$ to the diametrically opposite commutator segment on the associated disc of each pair. In other words, the commutator discs for each pair are cross connected by lines 178, 180, 182, 184, 186 and 188. By this cross connection it will be evident that the time of closing a circuit through two associated brushes which cooperate with adjacent discs may be adjusted accurately for almost any value less than the time required for one half revolution. In other words, the two brushes may be placed almost adjacent each other which will make the time of energization of that particular circuit very small or it may be moved around to some other part of the circumference to cause a lengthening of this time of energization.

By relatively adjusting the brushes on the commutator assembly indicated as $C_0$, $C_1$, the number of electrical cycles flowing for the weld time that the circuit is closed can be ascertained and fixed. Likewise the brush assemblies bearing on the commutator means $B_0$ and $B_1$ may be set to adjust the various times of closing and opening of the clamping means for holding the two electrodes together against the work and lastly the brush assemblies cooperating with the commutator means $A_0$ and $A_1$ control the start of the welding cycle. All of said adjustments may be easily and quickly made by turning the manual knobs 40 of the setting apparatus. The operation of our system will now be described.

First, of course, the line switches 70 and 100 are closed which through means not shown energize the synchronous motor driving shaft 8 and shafts 8 and 14 therefore rotate at constant speed thereafter. The machine is then placed in condition for operation by inserting some work between the welding electrodes and then the push button switch 138 is closed. When the commutator shaft therefore is in the correct position, a circuit is closed to energize the relay coil 120 to close the plurality of switches operated thereby, namely, 160, 110 and 128. This circuit through the push button switch 138 and relay 120 is completed as follows: from the secondary 116, through line 126, line 136, push button 138, line 140, brush 142, commutator disc 143, cross connecting link 178, commutator disc 149, brush 146, line 101, line 122, relay coil 120, line 118 back to secondary 116. There is also a parallel path or circuit through the other set of brushes, namely, from line 140 to brush 144, commutator segment 145, cross connection 180, commutator segment 147, brush 107, line 105 to line 122. It will thus be evident that there are two parallel circuits through the brushes to cut down the amount of current carried thereby, and that since each pair is carried on a single circular support, they will be adjusted simultaneously. Thus when the commutator portions rotate to a predetermined point, the relay coil 120 will close.

It will be noted that the arcuate distance between the brushes 142 and 146 or 144 and 107 is not very large and therefore this starting circuit is not maintained for long, but this is not necessary since upon closing the switches operated by the relay coil 120, a hold circuit therefor is established through the commutator units $B_0$, $B_1$ which have rotated now through a small angle, as follows: secondary 116, line 126, switch 128, line 130, brush 132, commutator segment 151, cross connection 184, brush 124, line 122, relay coil 120, line 118 to the other side of the secondary 116. In this case also there is a parallel brush circuit through the other pair of brushes 134 and 148. This will maintain the relay coil 120 energized during approximately one half revolution of the control shaft which will be sufficient to complete the welding cycle.

The closing of a second of the switches operated by the relay coil 120 energizes a relay 104 which controls a compressed air valve for operating the clamping means to hold the work between the electrodes and lastly the closing of switch 120 closes a circuit through the ignition electrodes of the two ignitron tubes 84 and 88 so that they may fire when the remainder of the circuit is completed by certain timing means. Thus as the shaft 14 continues to rotate, the relay means 104 maintains the work piece clamped between the electrodes and a circuit is thereafter completed through the commutator assembly $C_0$ and $C_1$ to cause the ignitron tubes to fire. This ignition system or circuit is completed as follows: from the primary line 80 through electrode 82 of one of the ignitrons, the igniting electrode 150, line 154, switch 156, line 158, switch 160, line 166, to brush 168, commutator segment 169, cross connecting line 188, commutator segment 171, brush 176, line 175, through the phase control means 173, line 172, igniting electrode 152 of the second ignitron tube, cathode 94 of the same to the opposite main line 90. While it may not appear from Figure 3 as though brush 176 contacts segment 171, it must be remembered that the shaft has rotated through an arc by this time and therefore this description is correct. Here again there is a parallel brush circuit through brushes 170 and 174.

In this manner the two igniting electrodes 150 and 152 are placed in series across the line, but of course only one of the tubes will fire inasmuch as they are connected in reverse order and for each half cycle only one anode will be of the proper polarity to allow its tube to fire. Therefore, as long as the ignition circuit is completed, the tubes will alternately fire each half cycle as long as the brushes complete the ignition circuit.

The results obtained by having two brushes for each commutator means are that the power will be divided between the two sets in parallel lines and therefore the sparking or arcing between the brushes and the commutator segments is less. Also, there is equal pressure on opposite sides of the shaft to balance the same. If it is desired to lengthen the time of welding, the brushes 168 and 176 are moved farther apart, or if it is desired to shorten the time, they are of course moved closer together. The same is true of the brushes controlling the operation of the clamping means and they may assume any desired position around the periphery of their commutator segments. Thus by adjusting the angular position of the brushes cooperating with the commutator members $A_0$, the operator can definitely set the initial time of operation of the welding cycle; by adjusting the brushes on the second group, the B group, the operator can adjust or control the time of clamping and unclamping of the electrodes on the work; and by adjusting the C group, the actual welding time per se. These adjustments may be very easily made and thus the whole welding cycle may be accurately and easily controlled.

We claim:

1. In a control system for controlling a plurality of parts having inter-related functions, a synchronously driven control shaft, a plurality of axially spaced commutator means mounted on said shaft, a plurality of sets of brushes mounted in juxtaposition to each commutator means and means to independently adjust the angular position of each set of brushes and connecting means coupling each commutator and brush assembly to different parts of the system, whereby the energization of the different parts will be synchronized and may be adjusted with respect to each other.

2. In a control system for controlling a plurality of parts having inter-related functions, a synchronously driven control shaft, a plurality of axially spaced commutator means mounted on said shaft, said means comprising an insulating disc and two substantially half circle conductive members carried thereby, a pair of brushes adjustably mounted adjacent each commutator and connecting means for coupling each brush to different parts of the system to control the energization of the same.

3. In timing mechanism, a shaft driven at a constant speed, a plurality of commutator means mounted on said shaft in axially spaced relation and forming a plurality of groups of two each, a pair of brushes adjustably mounted adjacent each commutator in diametrically opposed position and conductive means interconnecting the angularly opposite portions of the commutators composing a pair whereby the adjustment of one set of brushes of a pair will adjust the conductive time of the commutator group though there is no relative motion between the brushes on a single mount.

FRANCIS G. DA ROZA.
WILSON T. BRATTON.